Feb. 25, 1930.  G. L. McCARTHY ET AL  1,748,489
PHOTOGRAPHING APPARATUS
Filed March 25, 1925
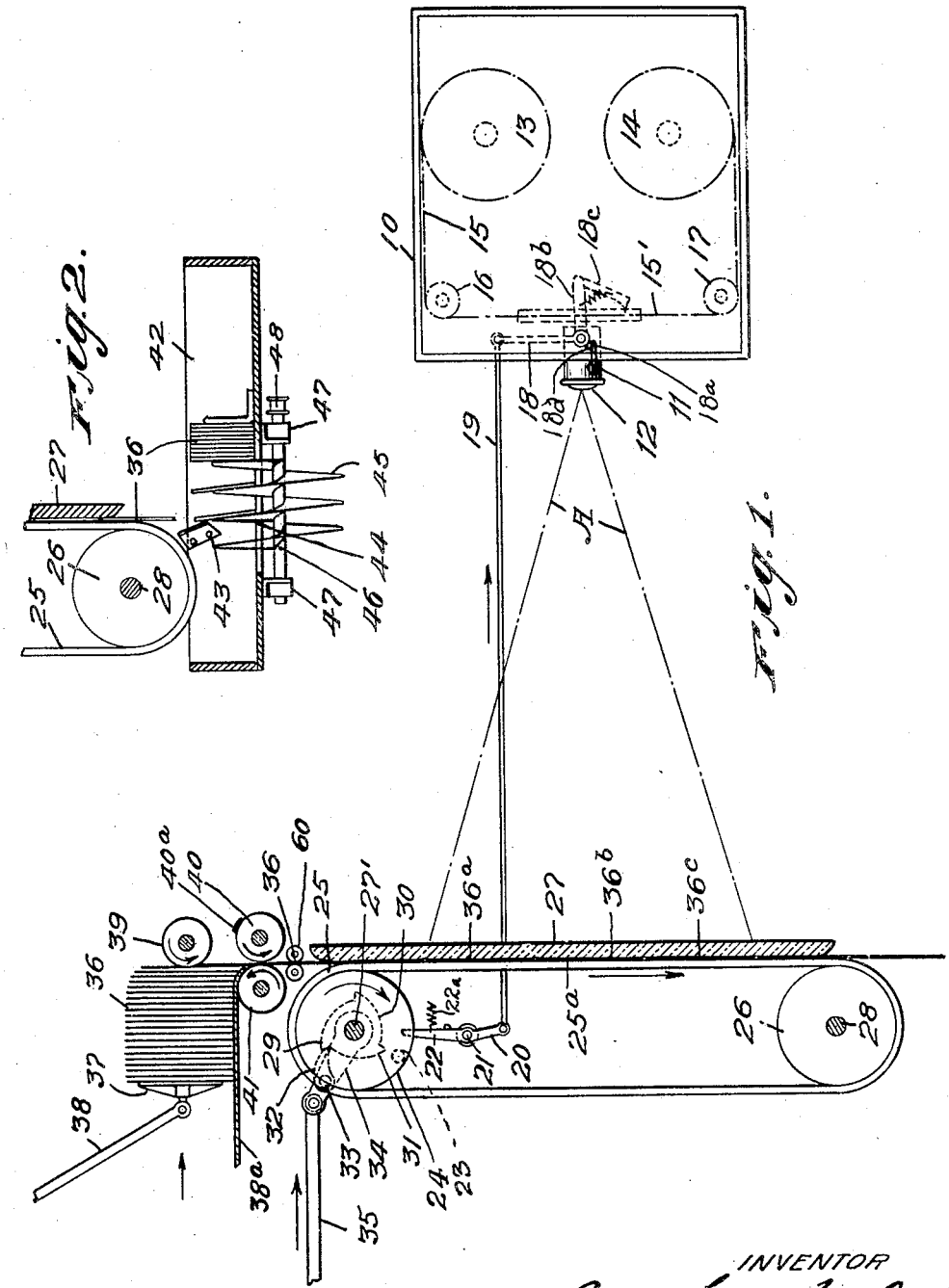

Patented Feb. 25, 1930

1,748,489

UNITED STATES PATENT OFFICE

GEORGE LEWIS McCARTHY, OF RYE, AND ABRAHAM NOVICK, OF FLUSHING, NEW YORK; SAID NOVICK ASSIGNOR TO SAID McCARTHY

PHOTOGRAPHING APPARATUS

REISSUED
FEB 20 1940

Application filed March 25, 1925. Serial No. 18,075.

This invention relates to the making of photographic records of discrete business documents. An important object of the invention is to provide apparatus for bodily carrying the discrete documents serially into the photographic field of a camera, together with mechanism timing the camera to operate in synchronism with the document feeding apparatus.

The invention finds advantageous employment in effecting the rapid and accurate photographing of bank checks or like documents seriatim. The checks are desirably arranged initially in stack form, are withdrawn from the stack one by one, and are then advanced bodily into the photographic field of a camera.

A still further object of the invention is to provide for the photographing of groups of the documents simultaneously, the camera operating mechanism being so timed with relation to the document feeding means that an exposure is effected only after a group of photographed documents has been fed out of the photographic field and has been replaced by a fresh group.

Other features relate to means for initially stacking the sheets in a manner designed to allow each sheet to be picked up at the proper time and automatically fed to exact photographing position; to means for ultimately restacking the several sheets automatically after they have been photographed and as they leave the feeding belt; and to means for automatically and intermittently positioning the sheets in the photographic field to assure that a group of sheets will be in correct photographing position with relation to the camera at the time when an exposure is made.

Other objects and advantages will hereinafter appear.

In the drawings wherein similar reference characters designate similar parts throughout the several views, Figure 1 is a diagrammatic view showing certain parts in section and disclosing the means for photographing the sheets, and Figure 2 is a fragmental detail view of a restacking means cooperating with the present machine.

Referring to the drawings there is disclosed a photographing apparatus or appliance preferably in the form of a camera 10 of the motion picture type, equipped with the usual focusing part 11 carrying the lens 12. On respectively upper and lower unwinding and winding reels 13 and 14 is trained the usual length of film 15 which passes over the idlers 16 and 17 by means of which a stretch of film 15' is always maintained rectilinearly substantially parallel with the front face of the machine. It will be understood that many parts of this camera have been omitted from the drawing but the camera includes suitable shutter operating and film feeding mechanism actuated by the crank or lever 18. The film feeding mechanism is indicated diagrammatically by the crank arm 18$^b$ and pawl 18$^c$ and the shutter operating mechanism is indicated by a shutter operating arm 18$^a$ in the path of a lug 18$^d$ on crank 18.

Connected pivotally to the lever 18 is a link or rod 19 which at its opposite end is connected to one arm 20 of a bell crank lever 20, 22 which is fulcrumed fixedly at 21 and urged in a clockwise direction by spring 22$^a$. The arm 22 of the bell crank lever 20, 22 projects into the orbit or path of movement of a pin 23 carried by a roll 24 fixed rotatively upon a shaft 27' supported in suitable bearings (not shown).

An endless belt 25 is trained upon the roll 24 and also upon another roll 26. These rolls 24 and 26 are positioned respectively at the upper and lower ends of the device, the upper roll 24 being the driving roll for setting the belt in motion. The belt 25 serves for conveying the sheets into position for being photographed, as will be explained hereinafter.

The driven roll 26 is fixed rotatively upon a shaft 28 and is located adjacent the lower end of a preferably vertically disposed transparent shield or glass panel 27, the roll 24 being located at the upper end of this panel or shield 27. The arrangement of rolls 24 and 26 is such that the front stretch 25$^a$ of the belt 25 extends substantially parallel with the shield 27 and in close proximity thereto. This belt stretch 25$^a$ and glass panel 27 form a guide through which the sheets to be photographed are conducted so as to be exposed through the glass panel 27.

Also fixed rotatively upon shaft 27' is a cam or ratchet having a plurality of lobes, say three lobes, 29, 30 and 31, adapted to be successively and intermittently actuated by a driver pawl 32 mounted pivotally upon a pin 33 carried by an arm 34 arranged to turn upon the shaft 27' during the actuation of the driver or pawl 32. The link 35 serves as a means for operating the arm 34 and pawl 32 by instrumentalities not shown. It will be seen that the roll 24 will be given three strokes during each revolution thereof by reason of which it will move intermittently advancing at each stroke a distance equal to one-third of its circumference. The belt 25 is advanced at each stroke a distance equal to the length of one of the sheets 36. These sheets are shown arranged in the form of a stack supported upon the shelf 38ª located just above the panel 27.

The sheets 36 are disposed vertically in a horizontal column being pressed by a presser 37 carried by an arm 38 into contact with a releasing roll 39 which engages the front sheet and pushes the same downwardly between two rolls 40 and 41. The former of these, roll 40, is provided with a rubber pad 40ª, the purpose of which is to engage the sheet frictionally and insert the same between a pair of feed rolls 60, which feed rolls advance the sheet to the conveyor belt 25. In order to prevent double feeding, as might be caused for example by a plurality of adhering checks moving downwardly together, there is provided the roller 41 which rotates at a low rate of speed in a direction opposite to that of the faster moving feed roller 40. This arrangement causes the sheets to be disengaged from each other and thus prevents the feeding of more than one sheet at a time.

As the checks enter between the belt 25 and panel 27, they are advanced intermittently because of the intermittent actuation of roller 24 as hereinbefore described. The advancing mechanism of the belt is timed with relation to the feed roll 40, there being one advancement of roller 24 and its belt for each rotation of the feed roll. The sheets are thus intermittently advanced behind the glass plate until after a time there will be three blanks in the position indicated at 36ª, 36ᵇ and 36ᶜ embraced within the photographic field A of the lens 12 of the camera, as indicated in the drawing. While the checks are in this position, the camera operates to take an exposure of these three sheets, this operation having been brought about by the actuation of the trip arm 22 and the consequent opening and closing of the shutter of the camera. This operation of the shutter is repeated after three advancements of the feed belt, at which time three new sheets will have been brought into position for being photographed, as indicated in Figure 1. The mechanism thus operates automatically to photograph serially all of the sheets contained in the stack 36. In the present form of embodiment three of such sheets are photographed at a time, but it will be understood that by a simple modification any desired number of sheets may be photographed at one operation. It will be understood that the camera is provided with suitable mechanism well known in the art for advancing the film step by step in accordance with the operation of the shutter so that an unexposed portion of the film is presented to the field of view for each photograph. In the illustrative embodiment the film is advanced by the action of the pin 23 in moving the lever 22 counter-clockwise, and the shutter operating mechanism is actuated by the spring impelled return movement of the arm 22 to normal position. The film thus produced will comprise a series of exposures, each exposure containing the photograph of three of the sheets of the stack. This film may be developed in the usual manner and when desired placed into suitable projection apparatus so that each of the sheets photographed therein may be examined when need therefor arises.

During the continuation of each stroke of the roll 24 and for the interval of each revolution thereof the already photographed checks are advanced and pushed beyond the panel 27 and are ready to be automatically restacked, if desired. Figure 2 shows one method of restacking them. As each photographed check leaves the belt 25 and panel at their lower ends the same is delivered vertically into a container 42 bearing against a fixed stop 43 at one point and against any of a series of vanes 45 mounted upon a feed screw or conveyor 46 trunnioned in suitable bearings 47 and driven through a pulley 48. The vanes of this conveyor carry forward each delivered check whereby they are pressed together in stack formation and at the same time advanced toward one end of the container 42.

The present invention is simple in construction and fool-proof in operation and serves quickly and accurately, successively to feed, photograph and restack a series of similarly-sized sheets such as checks. It will be understood that numerous modifications may be resorted to in practice without departing in principle from the details of construction set forth in the appended claims.

What we claim and seek to protect by Letters Patent is:

1. In a record making apparatus a camera, means for feeding discrete documents individually off a stack of such documents, intermittently operated means bodily carrying the said documents serially into position for substantially unobstructed exposure to the camera, and means mechanically timed with reference to the feeding means to operate the camera for photographing said documents when they are at rest in said position.

2. In a record making apparatus, a camera, means for feeding discrete documents off a stack of such documents, intermittently operated means bodily carrying the said documents serially into position for substantially unobstructed exposure to the camera, means mechanically timed with reference to the feeding means to operate the camera for photographing said documents when they are at rest in said position, and means for restacking the photographed documents.

3. In a composite record making apparatus, the combination of a photographing unit, means for operating said unit, document driving mechanism for bodily carrying documents individually and successively into the photographic field of said unit for substantially unobstructed exposure thereto, and mechanism automatically causing said unit-operating means to act in time with the feeding of said documents.

4. In a device of the kind described, the combination of a photographing device having a lens, a transparent shield upon which said lens is focused, a stack of slips, slip driving mechanism for advancing the slips successively from said stack of slips along said shield to be successively photographed, and means acting synchronously with said mechanism for operating said photographing device.

5. In a device of the kind described, the combination of a camera, a transparent shield upon which the lens of said camera is focused, shutter mechanism in said camera, a series of slips, slip moving means engaging said series of slips successively to advance the same along said shield to a focusing position with respect to said lens, and means for automatically operating said shutter mechanism when said slips are in focusing position.

6. In a composite record making apparatus, the combination of means for supporting a stack of slips, means for removing said slips one at a time from said stack, a transparent shield, a member contacting each released slip movably to cause the slip to slidably engage the length of said shield, means for causing the slips to be stopped in position to be exposed through said shield, mechanism for photographing the slips so positioned, and means for timing the action of the stopping means and photographing mechanism.

7. In a device of the kind described, the combination of a transparent shield, a belt movable in alignment therewith throughout its length, means introducing succesive sheets between said belt and shield to cause each sheet to be carried along said shield, means for photographing each sheet before it leaves said belt, and means for stacking the photographed sheets after they leave said belt.

8. In a device of the kind described, the combination of a glass panel, a camera having its lens focused thereupon, means engaging a plurality of successively arranged sheets simultaneously to position them against the panel within focus of said lens, mechanism for operating said camera, and a device actuated by said means and engaging said mechanism to actuate the latter.

9. In a device of the kind described, the combination of a glass panel, a camera having its lens trained thereupon, means supporting a stack of sheets adjacent said panel, several of said sheets being capable of being brought within the focal range of said lens, and constituting a photographing unit, means for severally releasing said sheets from said stack to position them separately in line with said panel, a belt acting in time with said means to draw several of said sheets along and in flat contact with said panel, shutter-operating mechanism carried by said camera, a trip for actuating said shutter operating mechanism, and means rendered automatically effective upon the presence of a photographing unit against said panel and within the focus of said lens, to actuate said trip 10. In a device as described, the combination of a camera, a glass panel in front of the lens of said camera, means supporting a plurality of sheets, means at one end of said panel for stacking said sheets, mechanism withdrawing each sheet of said stack and moving and positioning the same in a position within focus of the lens of said camera, and means at the opposite end of said panel for receiving and restacking said sheets.

11. In a device as described, the combination of a glass panel, an endless belt arranged operatively parallel thereto and having one of its stretches acting as a sheet positioner, in back of said panel, a camera having its lens in front of said panel, means rendering said camera photographically active, means intermittently controlling the action of said belt, and a common actuator for both means.

12. In a device as described, the combination of a glass panel, a camera in front of said panel having its lens trained upon said panel, an endless belt having one stretch disposed parallel with said panel and in close proximity thereto, rolls upon which said belt is trained, means for rotating one of said rolls to move said belt, means for inserting successively sheets between said belt and panel whereby each sheet is carried by said belt slidably along said panel, means for operating said camera, and means on the mentioned rotated roll for actuating the last-named means.

13. In a device of the kind described, the combination of a pair of rolls, an endless belt trained upon said rolls, one of said rolls being the drive roll, mechanism imparting plural strokes to said drive roll during each revolution thereof, a stack of sheets, means whereby each stroke of said drive roll causes said belt to position a sheet for photographic purposes, and means actuated at the completion of each revolution of said drive roll for taking photographs of as many sheets positioned as there are strokes to each of its revolutions.

14. In a device as described, the combination of a shelf, feed rolls stationed adjacent said shelf to deliver a sheet therebelow, a glass panel against which said sheet is delivered, a belt overlying each delivered sheet and designed to advance the same along said panel, means engaging said belt to cause it to bear upon each delivered sheet to positively carry the same towards the center of the belt, said belt arranged to stop intermittently to expose each sheet through said panel, and means controlled with said belt for photographing the exposed sheets.

15. In a device as described, the combination of photographing means, a glass panel in front of said means, a stack of sheets, a belt arranged to travel lengthwise of said panel and designed to feed said sheets severally as they are introduced between it and said panel, means for causing said belt to focus each sheet opposite said photographing means, means for actuating said belt and imparting a positive motion to each introduced sheet, and rolls engaging said sheets severally and acting in time with said belt-actuating means to bring said sheets in contact with the panel and belt.

16. In a device as described, the combination of slip photographing apparatus, a movable track confronting said apparatus by which each slip is bodily carried, means for training a group of slips upon said track, means synchronously controlling the operation of the slip carrying means and the photographing means, means controlling the registration of said train of slips during the operation of said apparatus in photographing them, and means for automatically stacking the photographed slips.

17. In an apparatus for making a record of discrete documents, in combination, a camera, feeding means for bodily carrying the discrete documents serially into the photographic field of the camera, and means mechanically timed to operate the camera synchronously with the feeding means.

18. In a record making apparatus, in combination, a camera, means for supporting documents to be photographed by the camera, document collating means for mechanically taking up the loose documents one by one and advancing them sequentially to arrange them in sets in predetermined, spatial relation and in position to be photographed simultaneously by the camera, and means automatically operating the camera synchronously with the collating means to photograph the documents of each arranged set simultaneously.

19. In an apparatus for making a condensed serial record of discrete documents, in combination, a camera arranged to photograph documents in miniature upon a continuous film strip, means for engaging and positively feeding the discrete documents bodily to and beyond photographing position and for thereafter discharging them, and means timed to operate the camera synchronously with the document feeding means.

20. In an apparatus for making a serial composite record of discrete documents, in combination, means for presenting the discrete documents sequentially for photographing, a camera arranged to photograph the documents upon a continuous film strip consecutively in the order of their presentation, and means for stacking and for controlling the arrangement on the stack of the photographed documents in the order of their presentation.

21. In an apparatus for making a composite record of a multiplicity of discrete documents, in combination, a camera having a focal range sufficient to include a plurality of such documents located in its focal plane, conveyor mechanism for feeding the documents successively into the focal range of the camera in the focal plane thereof, and means timed to operate the camera periodically to photograph sets of the documents simultaneously.

22. In apparatus for making a record of documents, in combination, a camera, means for feeding the documents individually into position for being photographed until a plurality of documents are positioned for photographing, and means for actuating the camera automatically when a predetermined number of documents has been thus fed into position to photograph them simultaneously, said feeding means also carrying the photographed documents out of the field of the camera before the camera is again actuated.

23. In an apparatus for making a record of documents, in combination, a camera, means for feeding the documents individually into position for being photographed until a plurality of documents are positioned for photographing, and means for actuating the camera automatically when a predetermined number of documents has been thus fed into position to photograph them simultaneously, said feeding means acting simultaneously to feed the one group into photographing position and run the other group out of photographing position between successive operations of the camera.

24. In an apparatus for making a record of documents, in combination, a camera, document feeding means moving in an orbital path and effective to carry the documents bodily from a receiving station through the photographic field of the camera to a discharge station, means for imparting unidirectional, intermittent movement to the feeding means, and means controlling the relative timing of the operations of the camera and the feeding means to cause the camera to be actuated between successive movements of the feeding means.

25. A photographic apparatus comprising a camera having a defined angular field of view, means for feeding a continuous strip of sensitive material intermittently through said camera, document driving mechanism for bodily moving a series of separated documents individually and successively transversely of said field of view for substantially unobstructed exposure to the camera, and mechanism automatically operative, in timed relation with the movement of the documents, to control the production of a single intermittent movement of the sensitive material at each operation.

26. A photographic apparatus comprising a camera having a defined angular field of view and an exposure field, means for feeding a continuous strip of sensitive material intermittently past said exposure field, a shutter, document driving mechanism for bodily moving a series of separated documents individually and successively transversely of the field of view of said camera for substantially unobstructed exposure thereto, and mechanism automatically controlling the operation of said shutter and of said first named feeding means in timed relation with the movement of said documents.

27. A photographic apparatus comprising a camera having a defined angular field of view and an exposure field, means for feeding a continuous strip of sensitive material intermittently past said exposure field, a shutter, a document driving mechanism for bodily moving a series of separated documents individually and successively transversely of the field of view of said camera for substantially unobstructed exposure thereto, and mechanism automatically operative to control a single actuation of the shutter and a single operation of the first-named feeding means in timed relation with the movement of the documents.

28. Photographic recording apparatus comprising a camera having an exposure position, means for feeding a continuous strip of sensitive material intermittently past said exposure position, a shutter, feeding means intermittently operative to move separated documents into a position to be photographed by said camera, and a common means for controlling the operation in timed relation of said shutter and of both said feeding means.

29. Photographic recording apparatus comprising means intermittently operative to feed separated documents into a copying position, a camera having an exposure position, means for feeding a continuous strip of sensitive material intermittently past said exposure position, a shutter, and a common control operative on both said feeding means and said shutter to cause a single operation of the second feeding means and shutter in timed relation with a predetermined cycle of operation of said first feeding means.

30. Photographic recording apparatus comprising means operative to feed separated documents into a copying position and to hold them in such position, a camera having an exposure position, means for feeding a continuous strip of sensitive material intermittently past said exposure position, a shutter, and mechanism operative on said second feeding means and said shutter to cause a single operation thereof and controlled by the first named means.

31. Photographic recording apparatus comprising means having a cycle of operation to feed groups of separated documents into a copying position, a camera having an exposure position, means for feeding a continuous strip of sensitive material intermittently past said exposure position and a shutter, and mechanism operative on said second feeding means and said shutter to cause a single operation thereof and controlled by said first-named means.

32. Photographic recording apparatus comprising means having a cycle of operation to feed groups of separated documents into a copying position, a camera having an exposure field, means for feeding a continuous strip of sensitive material intermittently past said exposure field and a shutter, and a common control for all of said elements and operative on said second feeding means and said shutter to cause a single operation thereof in timed relation to said cycle of operation of said first feeding means.

33. A photographic apparatus comprising a camera having a definite angular field of view, means for intermittently feeding a continuous strip of sensitive material through said camera, a second feeding means operative to move separated documents individually into the definite angular field of view, and into a position to be photographed by said camera, and mechanism automatically operative to control the first feeding means in timed relation to the movement of the documents.

34. A photographic apparatus comprising a camera having a definite angular field of view, means for intermittently feeding a continuous strip of sensitized material through the camera, a shutter, means for supporting separated documents individually within the angular field of view and means controlling the removal of said documents separately from the angular field of view, and mechanism automatically operative to control the last named means in timed relation to the operation of the feeding means and the shutter.

In testimony whereof we have affixed our signatures to this specification.

GEORGE LEWIS McCARTHY.
ABRAHAM NOVICK.

DISCLAIMER 1,748,489.—*George Lewis McCarthy*, Rye, and *Abraham Novick*, Flushing, N. Y. PHOTOGRAPHING APPARATUS. Patent dated February 25, 1930. Disclaimer filed April 11, 1935, by George Lewis McCarthy (assignee of the entire interest of Abraham Novick), and the exclusive licensee, *Recordack Corporation*.

Hereby enter this disclaimer of claims Nos. 3, 4, 5, 8, 17, 18, 19, 20, 21, 22, 25, 26, 27, 28, 29, 30, 31, 32, 33, and 34 as said claims appear in the original Letters Patent hereinabove referred to.

[*Official Gazette April 30, 1935.*]